(12) United States Patent
Dewey

(10) Patent No.: US 10,524,450 B1
(45) Date of Patent: Jan. 7, 2020

(54) KIBBLE DISPENSER

(71) Applicant: HIMALAYAN CORPORATION, Mukilteo, WA (US)

(72) Inventor: Alan J. Dewey, Marysville, WA (US)

(73) Assignee: Himalayan Corporation, Mukilteo, WA (US)

( * ) Notice: Subject to any disclaimer, the term of this patent is extended or adjusted under 35 U.S.C. 154(b) by 103 days.

(21) Appl. No.: 15/684,053

(22) Filed: Aug. 23, 2017

(51) Int. Cl.
*A01K 5/01* (2006.01)
*A01K 15/02* (2006.01)

(52) U.S. Cl.
CPC .......... *A01K 5/0135* (2013.01); *A01K 15/025* (2013.01)

(58) Field of Classification Search
CPC .. A01K 15/025; A01K 15/026; A01K 5/0135; A01K 5/0114; A01K 5/01; A01K 5/00; A01K 15/00
USPC ................. 119/707, 709, 710, 711
See application file for complete search history.

(56) References Cited

U.S. PATENT DOCUMENTS

| | | | | | |
|---|---|---|---|---|---|
| 4,884,807 | A * | 12/1989 | Welch | ..................... | A63B 43/00 473/575 |
| 6,425,348 | B1 * | 7/2002 | Twain | ..................... | A01K 1/033 119/482 |
| 8,701,599 | B2 | 4/2014 | Dewey | | |
| 9,004,012 | B2 * | 4/2015 | Taylor | ................... | A01K 15/026 119/710 |
| 2011/0209669 | A1 * | 9/2011 | Miavitz | ................ | A01K 15/025 119/707 |
| 2013/0019812 | A1 * | 1/2013 | Rutherford | .......... | A01K 15/025 119/707 |
| 2013/0036988 | A1 * | 2/2013 | Lai | ....................... | A01K 15/026 119/709 |
| 2014/0209038 | A1 * | 7/2014 | Simon | .................. | A01K 15/026 119/709 |
| 2014/0224184 | A1 * | 8/2014 | Dewey | ................. | A01K 15/026 119/709 |
| 2015/0237829 | A1 * | 8/2015 | Tsengas | ............... | A01K 15/025 119/709 |
| 2016/0165844 | A1 * | 6/2016 | Nunn | ................... | A01K 15/025 119/709 |
| 2017/0020109 | A1 | 1/2017 | Dewey | | |
| 2017/0231195 | A1 | 8/2017 | Dewey | | |

\* cited by examiner

*Primary Examiner* — Kathleen I Alker
(74) *Attorney, Agent, or Firm* — Amin, Turocy & Watson, LLP

(57) ABSTRACT

A kibble dispenser may comprise an elongated middle section between first and second bulbous end sections. The middle section may comprise a kibble access window, and at least one of the first or second bulbous end sections may comprise a kibble insertion window. A kibble storage cavity inside the kibble dispenser may extend at least between the kibble insertion window and the kibble access window. A rope may be wrapped around the kibble dispenser, and secured at the first and second bulbous end sections, such that the rope passes over the kibble access window.

15 Claims, 5 Drawing Sheets

Kibble Dispenser 100

KIBBLE DISPENSER

BACKGROUND

There are a variety of kibble dispenser products available today. In general, the goals of such products include maintaining pet interest through occasional kibble rewards, challenging the pet, and dispensing kibble slowly to reduce calories consumed and avoid frequent refilling requirements. In general, there is an ongoing need to increase the variety of both kibble dispenser products to meet the needs and preferences available to dog and other pet owners.

SUMMARY

A kibble dispenser is disclosed, as well as methods of making and using the disclosed product. In some examples, the kibble dispenser, may comprise an elongated middle section between first and second bulbous end sections. The middle section may comprise a kibble access window with diameter larger than kibble inserted into the kibble dispenser. At least one of the first or second bulbous end sections may comprise a kibble insertion window, also having a diameter larger than kibble inserted into the kibble dispenser, to permit insertion of kibble into said kibble dispenser. A kibble storage cavity inside the kibble dispenser may extend at least between the kibble insertion window and the kibble access window. A rope may be wrapped around the kibble dispenser, and secured at the first and second bulbous end sections, such that the rope passes over the kibble access window. Additional aspects and features of this disclosure will be apparent from the detailed description and drawings.

BRIEF DESCRIPTION OF THE DRAWINGS

Various features and attendant advantages of the disclosed technologies will become fully appreciated when considered in conjunction with the accompanying drawings, in which like reference characters designate the same or similar parts throughout the several views, and wherein.

DETAILED DESCRIPTION

Figure 1:
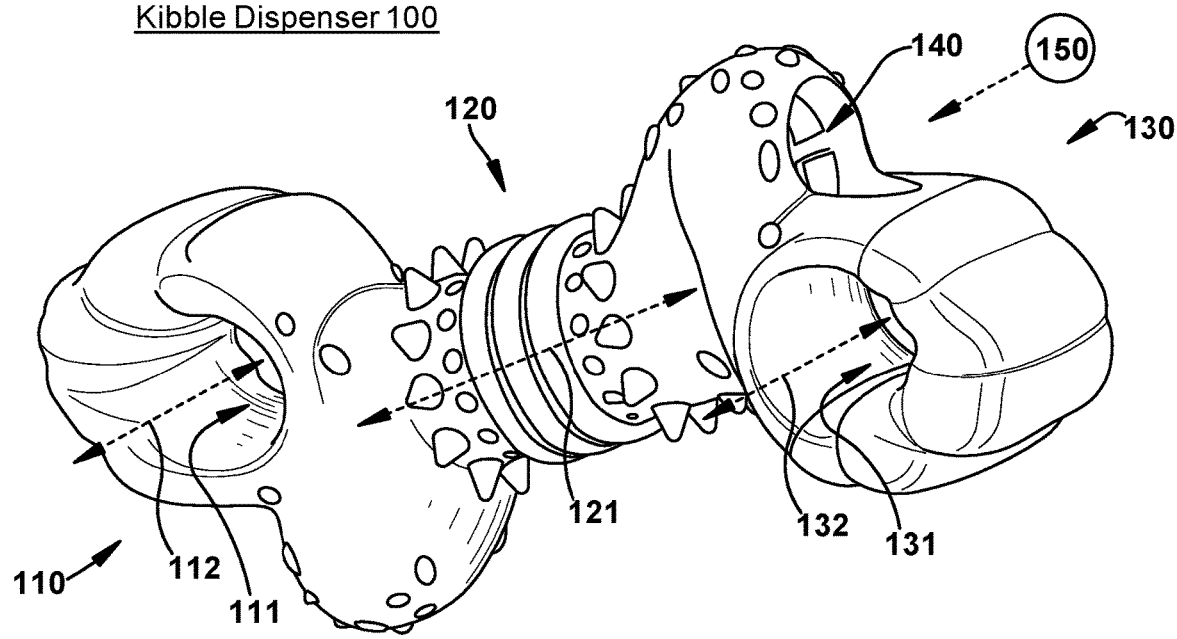
FIG. 1 is a perspective view of an example kibble dispenser.

Prior to explaining embodiments of the invention in detail, it is to be understood that this disclosure is not limited to the details of construction or arrangements of the components and method steps set forth in the following description or illustrated in the drawings. Embodiments of this disclosure are capable of other embodiments and of being practiced and carried out in various ways. Also, it is to be understood that the phraseology and terminology employed herein are for the purpose of the description and should not be regarded as limiting.

This disclosure describes a kibble dispenser. The disclosed kibble dispenser may optionally have a bone-like shape, with an elongated middle section and bulbous end sections at either end. An internal kibble storage cavity may store kibble inside the kibble dispenser. Kibble may be loaded into to the kibble storage cavity at a kibble insertion window, and kibble may be dispensed from the kibble dispenser at a kibble access window. The kibble insertion window may be located at any convenient location on the kibble dispenser, e.g., at one of the bulbous end sections. The kibble access window may be located on the middle section, such that a rope wrapped around the kibble dispenser, and secured at the bulbous end sections, passes over the kibble access window. The rope thus prevents kibble from falling out of the kibble access window, requiring a dog (for example) to move the rope aside in order to access the kibble. The disclosed kibble dispenser thereby presents an engaging and rewarding challenge for dogs and/or other pets.

Figure 2:
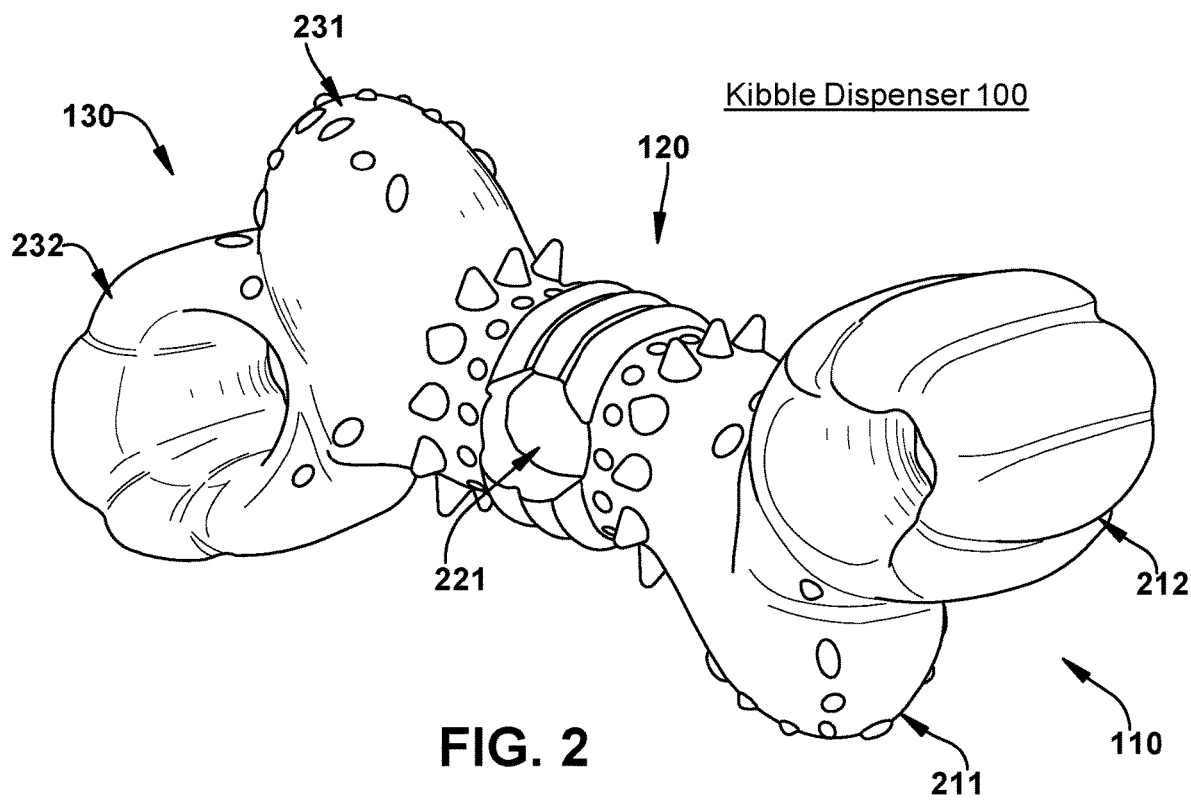
FIG. 2 is a second perspective view.

FIG. 1 and FIG. 2 are perspective views of an example kibble dispenser, in accordance with some embodiments of this disclosure. Kibble dispenser 100 includes a first bulbous end section 110, an elongated middle section 120, and a second bulbous end section 130. Middle section 120 has a middle section length extending between the first (proximal) end section 130, and the second (distal) end at end section 110.

In some embodiments, the middle section 120 may be substantially cylindrical in shape, as illustrated in FIG. 1. The middle section 120 may be from 2-6 inches long, and from 0.75-1.75 inches in diameter. The end sections 110, 130 may comprise widths which are larger than a largest width of the middle section 120. For example, end sections 110, 130 may comprise widths from 1-3 inches wide in some embodiments. Other shapes and dimensions may be appropriate for other embodiments.

Figure 9:
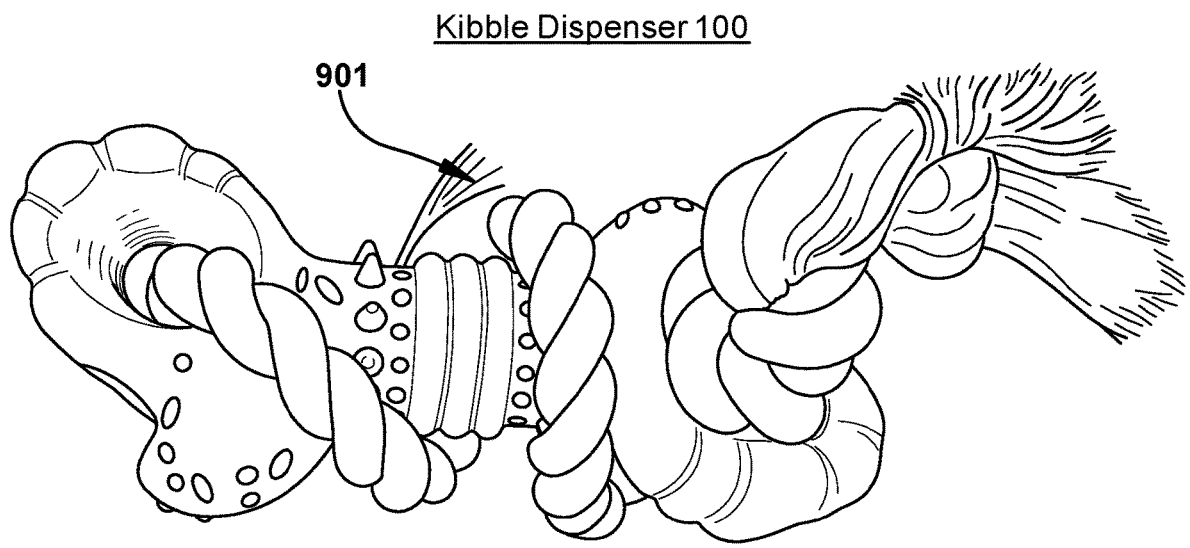
FIG. 9 is a front elevation view thereof which includes a rope.

In some embodiments, the kibble dispenser 100 may comprises a chew resistant material, e.g., a nylon, rubber, or plastic material. For example, a main body of the kibble dispenser 100, including middle section 120 and end sections 110 and 130 as illustrated in FIG. 1, may consist of a single molded piece of nylon, rubber, or plastic material, or a composite thereof. A rope 901 of kibble dispenser 901, such as illustrated in FIG. 9, may comprise a nylon, hemp, leather, or other material.

In some embodiments, the main body of the kibble dispenser 100, including middle section 120 and end sections 110 and 130 as illustrated in FIG. 1, may be substantially non-deformable, i.e., not noticeably deformable by hand. The use of a nylon or hard plastic material of sufficient thickness will generally result in a non-deformable product. In other embodiments, the main body of the kibble dispenser 100 may be at least partially deformable, or partly deformable and partly non-deformable. For example, the end sections 110 and 130 may be made from a deformable material such as rubber, while the middle section 120 may be made from a non-deformable nylon, and the different materials may be joined together by coupling interfaces and/or by welding, gluing or otherwise joining the materials.

Figure 5:
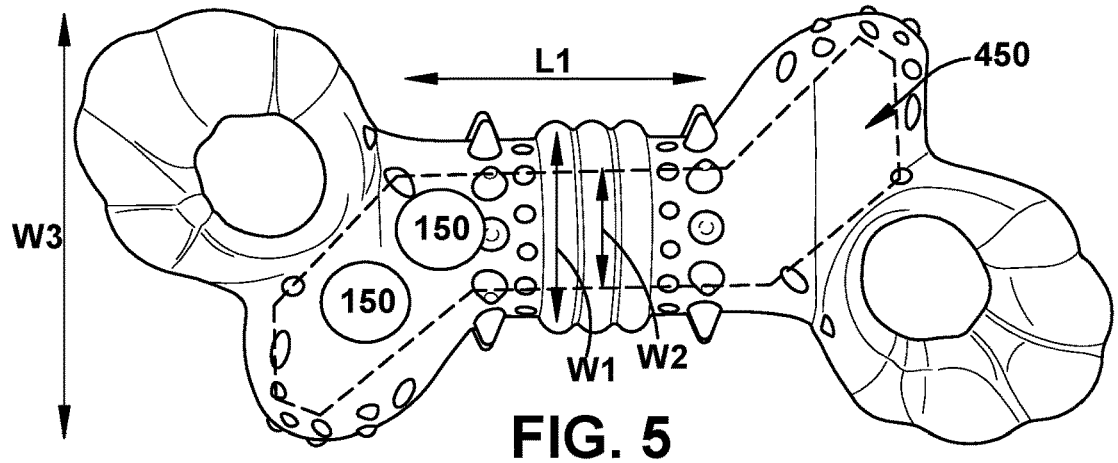
FIG. 5 is a front elevation view thereof.

Kibble dispenser 100 includes an internal kibble storage cavity, illustrated for example in FIG. 5. Kibble, e.g., kibble 150, may be stored in the kibble storage cavity. Kibble 150 may be loaded into the kibble storage cavity via kibble insertion window 140, and kibble 150 may be dispensed from the kibble storage cavity via kibble access window 221. Kibble insertion window 140 and kibble access window 221 may each comprise diameters or other opening dimensions, as appropriate, which are larger than dimensions of kibble 150, to allow kibble 150 to pass through kibble insertion window 140 and kibble access window 221. In some embodiments, the kibble access window 221 and the kibble insertion window 140 may be substantially round, as illustrated in FIG. 1, and from 0.25-0.75 inches in diameter.

Figure 10:
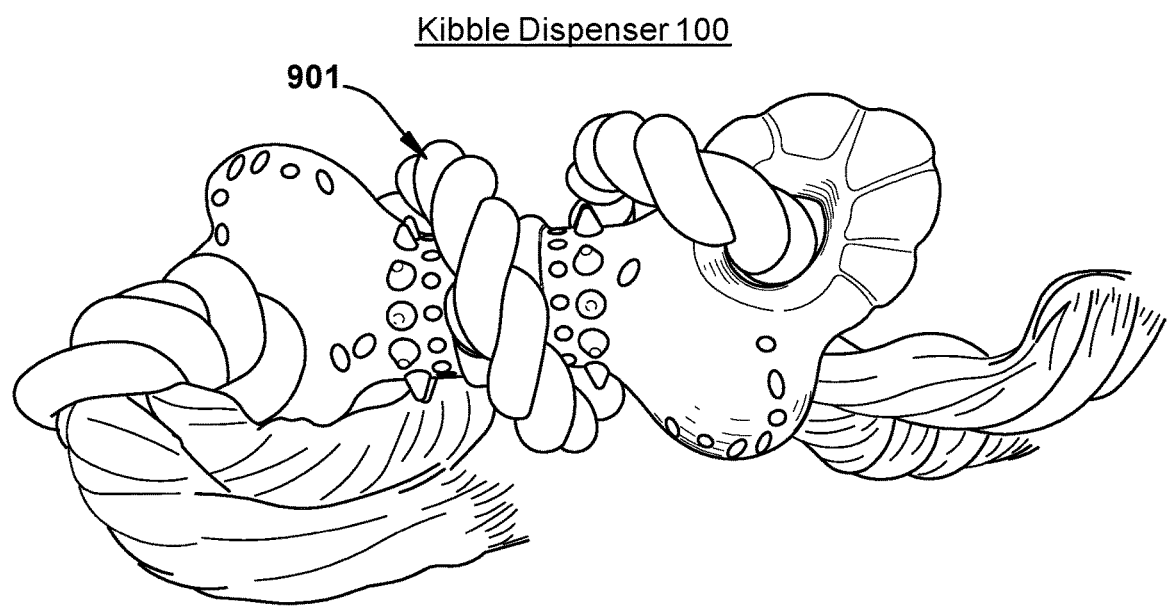
FIG. 10 is a rear elevation view thereof which includes the rope.
Figure 11:
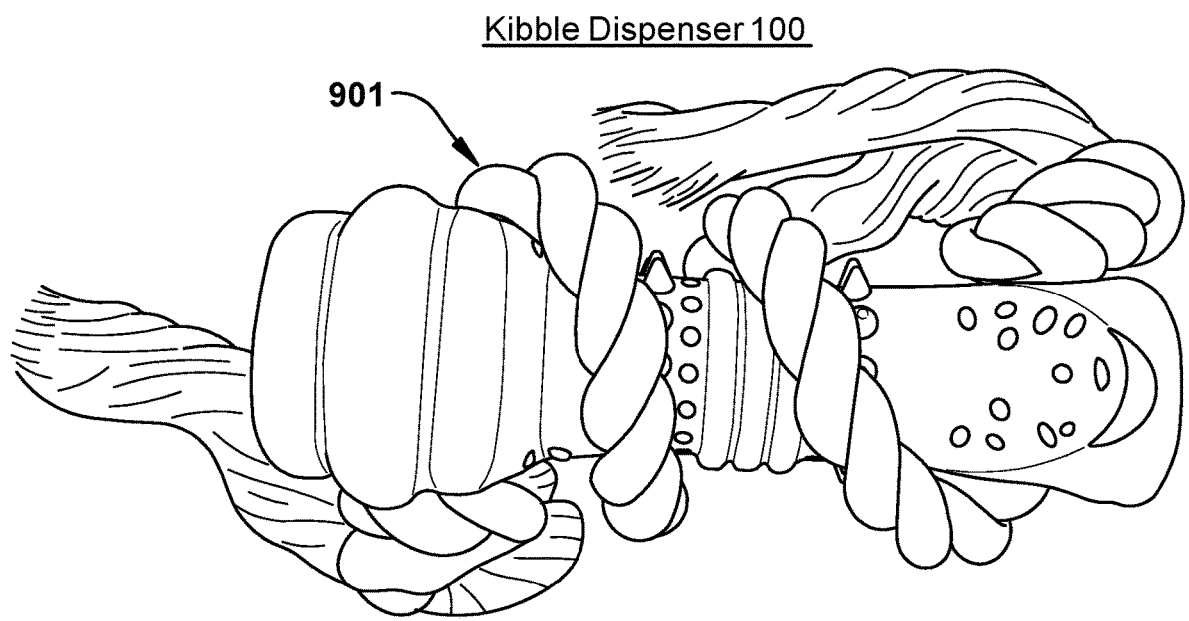
FIG. 11 is a left side elevation view thereof which includes the rope.
Figure 12:
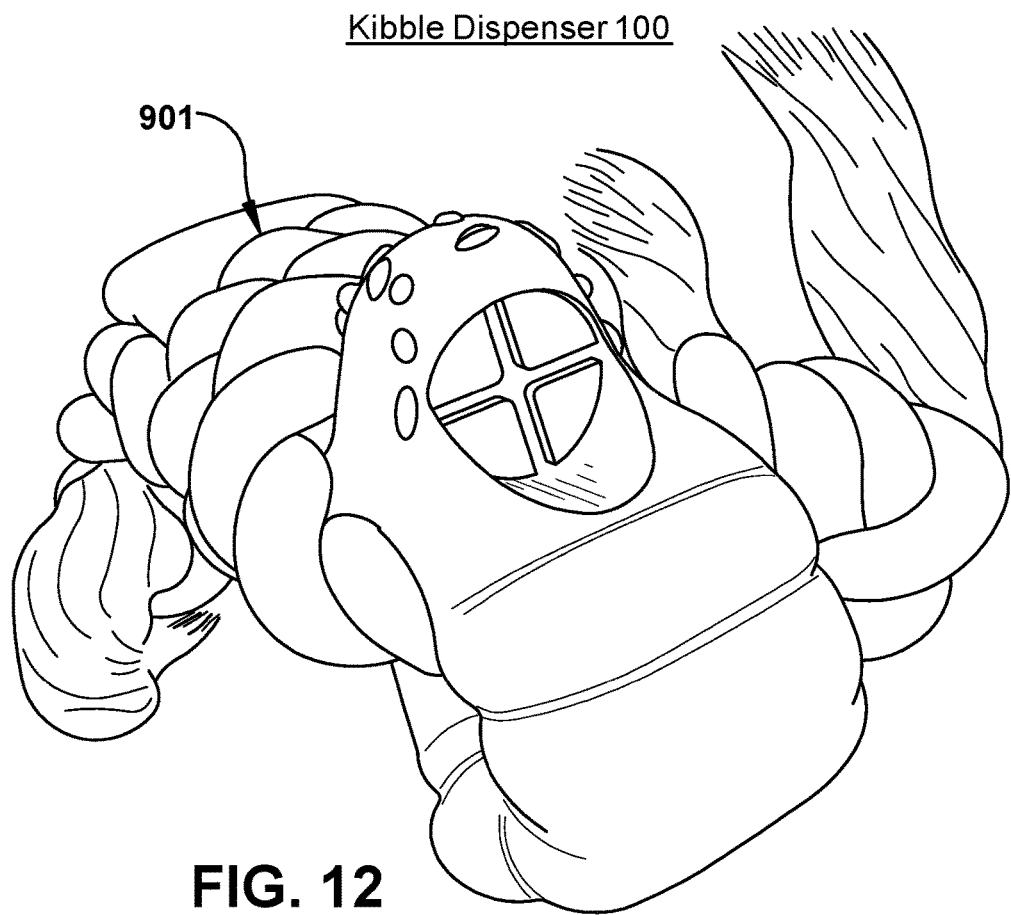
FIG. 12 is a perspective view thereof which includes the rope.

Kibble access window 221 may be located on elongated middle section 120, such that a rope wrapped around elongated middle section 120 at least partially covers the kibble access window 221, e.g., as illustrated in FIG. 10. Kibble insertion window 140 may be located at any convenient location on kibble dispenser 100. For example, in the illustrated embodiment, the kibble insertion window 140 is located on the horn of first end section 130.

Some embodiments of this disclosure may omit kibble insertion window 140. For example, kibble may be inserted into kibble dispenser 100 via kibble access window 221, in which case a separate kibble insertion window 140 may be unnecessary. Also, some embodiments may be adapted for different approaches to loading kibble 140 in the kibble dispenser 100. For example, embodiments may include separately molded pieces for middle section 120 and at least one end section 110, 130. The separate pieces may decouple for loading the kibble dispenser 100, and may be subsequently re-coupled together.

Kibble dispenser 100 includes attachment points for attaching a rope at each end section 110, 130. In the illustrated embodiment, each end section 110, 130 comprises a horn and a loop, as illustrated in FIG. 2. End section 110 comprises horn 211 and loop 212. End section 130 comprises horn 231 and loop 232. Loops 211, 231 surround rope windows 111, 131. Rope windows 111, 131 provide attachment points for the rope which is wrapped around the kibble dispenser, as illustrated in FIGS. 9-12.

In some embodiments, a knot may be tied in a first end of the rope 901 (illustrated in FIGS. 9-12). The rope 901 may be threaded through a first rope window, e.g., 131. The knot prevents the first end of the rope 901 from slipping through the rope window 131, thereby securing the first end of the rope at the end section 130. The rope 901 may then be wrapped one or more times, e.g., twice, around middle section 120, as illustrated in FIG. 9. The second (opposite) end of rope 901 may be threaded through the second (opposite) rope window 111, and a knot may be tied in the second end of the rope 901 in order to prevent the second end of the rope 901 from slipping through the rope window 111. The rope 901 thus passes through the rope windows 111, 131 in order to secure the rope 901 to the kibble dispenser 100.

In some embodiments, the knots in rope 901 may be on opposite sides of kibble dispenser 100, as illustrated in FIG. 9. In other embodiments, the knots in rope 901 may be on a same side of kibble dispenser 100, e.g., by wrapping the rope 901 an extra half turn around middle section 120.

In some embodiments, the rope windows 111, 131 may be substantially cylindrical, as illustrated in FIG. 1, and 0.5-1.0 inches in diameter. Smaller or larger dimensions may be appropriate for other embodiments. The rope 901 may be of an appropriate thickness such that knots in rope 901 will prevent rope 901 from slipping through rope windows 111, 131. For example, a rope having a thickness which is about 70%-100% of the diameter of rope windows 111, 131 should be sufficiently thick for some embodiments.

In some embodiments, the rope windows 111, 131 may be oriented such that central axes 112, 132 of the rope windows 111, 131 are perpendicular to a central axis 121 of the middle section 120, as illustrated in FIG. 1. Furthermore, a central axis 132 of a first rope window 131 may be offset to a first side of the central axis 121 of the middle section 120, and wherein a central axis 112 of a second rope window 111 may be offset to a second (opposite) side of the central axis 121 of the middle section 120, as illustrated in FIG. 1. In other words, horns 211 and 231 are diagonally across from one another, and loops 212 and 232 are also diagonally across from one another.

Rope windows 111, 131 are one example type of attachment point for attaching a rope at each end section 110, 130. However, some embodiments may replace rope windows 111, 131 with other types of attachment points. For example, rope 901 may be clamped, sewn, or glued at end sections 110, 130. Rope 901 may be tied around end sections 110, 130, rather than threaded through loops 212, 232. This disclosure is not limited to any particular means of attaching rope 901 at end sections 110, 130.

Figure 3:
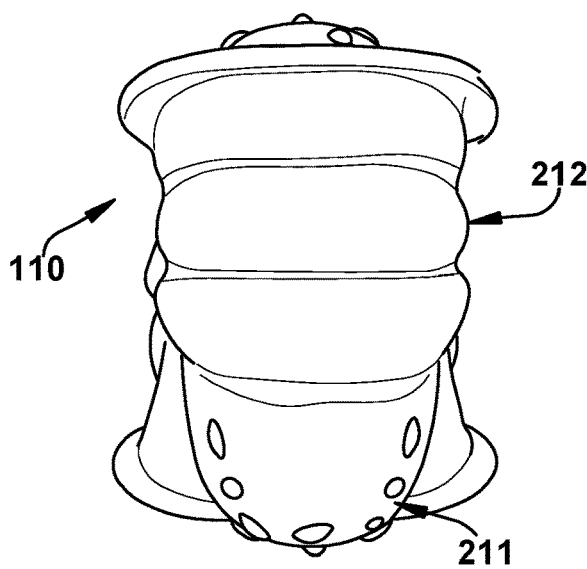
FIG. 3 is a top plan view thereof.
Figure 4:
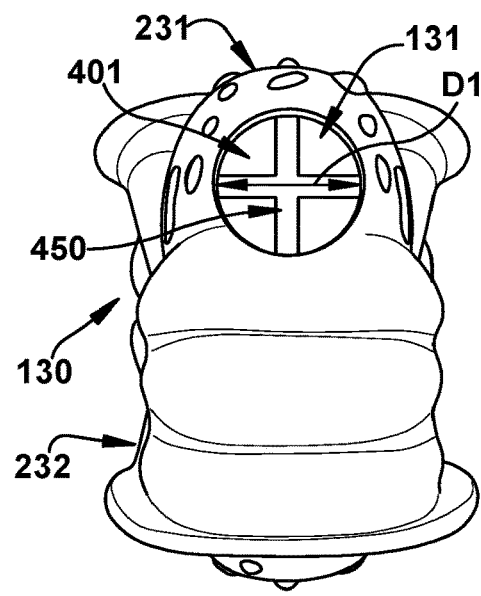
FIG. 4 is a bottom plan view thereof.

FIG. 3 is a top plan view of the example kibble dispenser 100, in accordance with some embodiments of this disclosure, and FIG. 4 is a bottom plan view thereof. FIG. 3 provides a view of end section 110, including loop 212 and horn 211 thereof. FIG. 4 provides a view of end section 130, including loop 232 and horn 231 thereof. FIG. 4 furthermore illustrates kibble insertion window 140 positioned in the horn 231. In the illustrated embodiment, kibble insertion window 140 is a round opening into kibble storage cavity 450, and kibble insertion window 140 has a diameter D1. In other embodiments, kibble insertion window 140 may be triangular, square, or another polygon shape.

Kibble insertion window 140 comprises a slide preventer 401 in order to prevent kibble from sliding out of the kibble storage cavity 450. In the illustrated embodiment, slide preventer 401 comprises four flexible flaps attached around the perimeter of kibble insertion window 140 and protruding into the kibble insertion window 140. The flaps bend to allow insertion of kibble 150 through kibble insertion window 140 and into the kibble storage cavity 450, while preventing kibble from subsequently sliding out of the kibble storage cavity 450. In other embodiments, more or fewer flaps, or a latching door or other structure may be used as a slide preventer 140.

FIG. 5 is a front elevation view of the example kibble dispenser 100, in accordance with some embodiments of this disclosure. A dotted line in FIG. 5 is used to illustrate an example shape of an internal kibble storage cavity 450 inside of kibble dispenser 100. The kibble storage cavity 450 extends at least between the proximal and distal ends of the middle section 120, and furthermore, in the illustrated embodiment, kibble storage cavity 450 extends into end section 110, 130 as well. Example kibble 150 is illustrated inside kibble storage cavity 450. Multiple pieces of kibble 150 may be stored in kibble storage cavity 450, and kibble access window 221 may be sized such that a single piece of kibble 150 may fall out of kibble access window 221 when rope 901 is moved aside. The kibble storage cavity 450 has dimensions, e.g., W2, larger than kibble 150 inserted into the kibble dispenser 100.

FIG. 5 illustrates example dimensions of the kibble dispenser 100. A length L1 of middle section 120, i.e., a length between a base of end section 110 and a base of end section 130, may be, e.g., from 2-6 inches long, as noted herein. A width or diameter W1 of middle section 120 may be, e.g., from 0.75-1.75 inches. A width or diameter W2 of kibble storage cavity 450 may be, e.g., about 75%-95% of the width W1. A width W3 of end sections 110, 130, that is, a width from the outermost portion of the horn to the outermost portion of the loop may be, e.g., from 1-3 inches, and wider than the width W1, e.g., about 1.5-2.5 times as wide as W1. A variety of other example dimensions are inherently disclosed in FIG. 5 and the other figures herein as will be appreciated.

Figure 6:
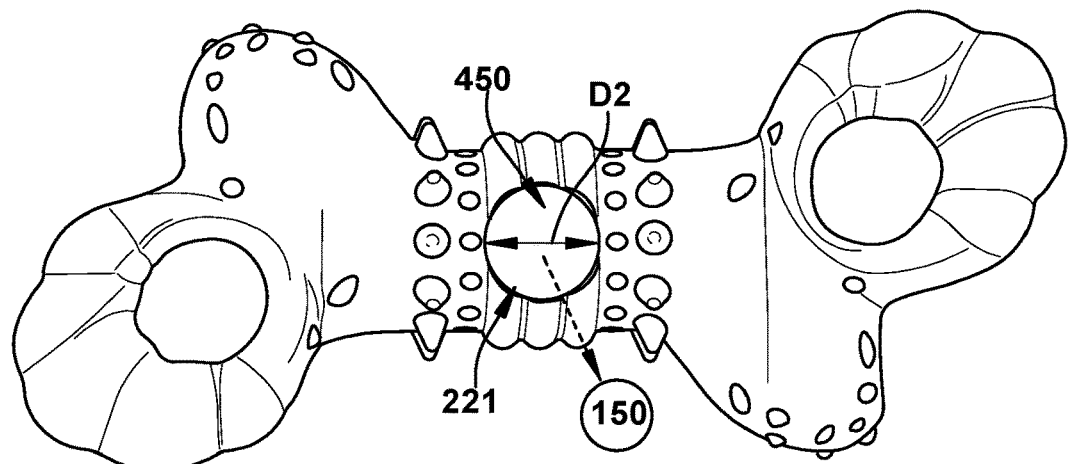
FIG. 6 is a rear elevation view thereof.

FIG. 6 is a rear elevation view of the example kibble dispenser 100, in accordance with some embodiments of this disclosure. FIG. 6 illustrates an example round kibble access window 221, having a diameter D2. As noted herein, in some embodiments, diameter D2 may be from 0.25-0.75 inches, although larger or smaller dimensions and square, triangle, or other polygonal shapes are also within the scope of this disclosure. The dimensions of kibble access window 221 may generally be larger than those of kibble 150, to allow kibble 150 to fall through kibble access window 221.

In the illustrated embodiment, kibble access window 221 provides an open, unobstructed passage between the exterior of the main body of the kibble dispenser 100, and the kibble storage cavity 450 inside the kibble dispenser 100. Of course, the kibble access window 221 is obstructed by rope 901 as illustrated in FIGS. 9-12. In some embodiments, kibble access window 221 may be further obstructed, e.g., by a flexible obstruction member of elastic or other material, in order to further limit a kibble dispensing rate of the kibble dispenser 100.

Figure 7:
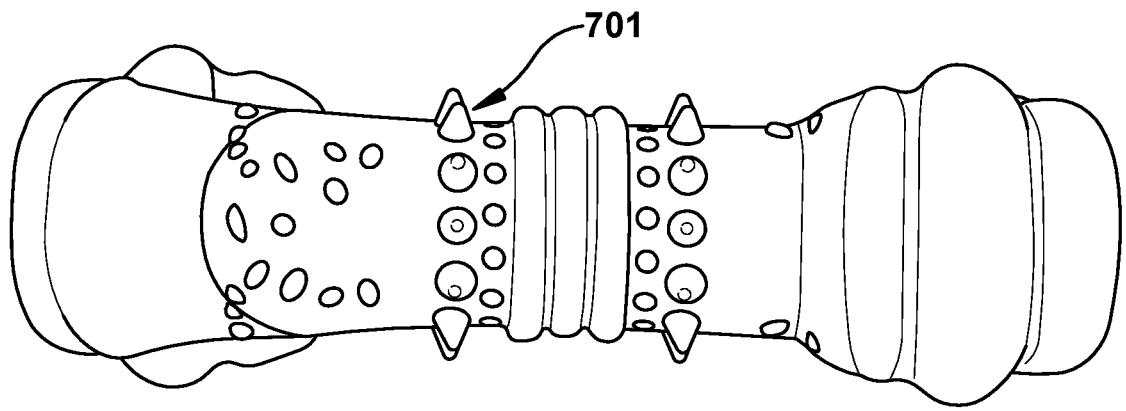
FIG. 7 is a right side elevation view thereof.
Figure 8:
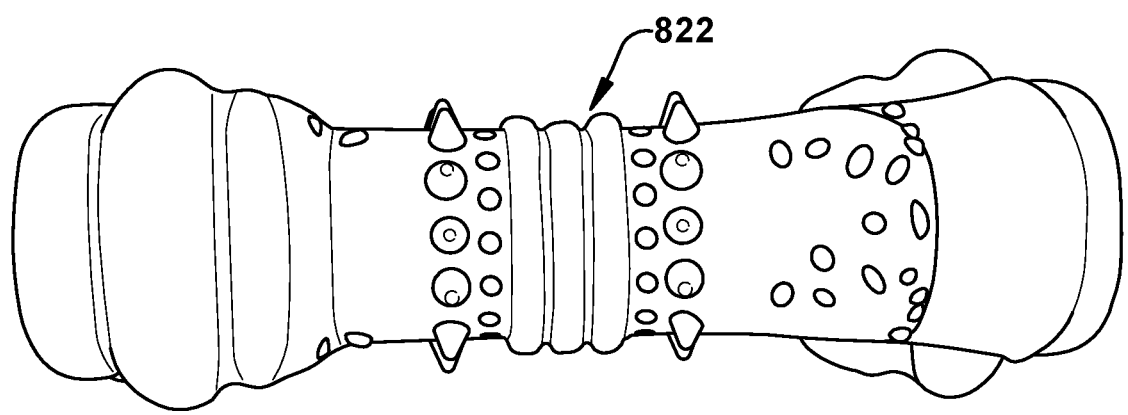
FIG. 8 is a left side elevation view thereof.

FIG. 7 is a right side elevation view of the example kibble dispenser 100, in accordance with some embodiments of this disclosure, and FIG. 8 is a left side elevation view of thereof. FIGS. 7 and 8 illustrate an example plurality of surface texture elements 701 on kibble dispenser 100, as well as an example reinforced section 822 of the elongated middle section 120.

In the illustrated embodiment, kibble dispenser 100 comprises several different types of surface texture elements 701. Middle section 120 comprises rings of conical surface texture elements 701, circling around middle section 120, with a ring at each end of middle section 120. The conical surface texture elements 701 may serve to hinder sliding of rope 901 along middle section 120, thereby adding challenge to extraction of kibble from kibble dispenser 100. Middle section 120 and end sections 110, 130 furthermore comprise a plurality of low-profile texture elements.

Reinforced section 822 may comprise a plurality of bands of thicker material circling around middle section 120, as shown. The reinforced section 822 may comprise the kibble access window 221, as in the illustrated embodiment.

FIG. 9, FIG. 10, FIG. 11, and FIG. 12 are a front elevation view, a rear elevation view, a left side elevation view, and a perspective view of the example kibble dispenser 100, in accordance with some embodiments of this disclosure. FIGS. 9-12 illustrate the rope 901 of the kibble dispenser, as described herein.

While various embodiments have been disclosed herein, other aspects and embodiments will be apparent to those skilled in art.

The invention claimed is:

1. A kibble dispenser, comprising:
an elongated middle section comprising a middle section length, a proximal end, a distal end, and a kibble access window positioned between said proximal and distal ends;
a first bulbous end section at said proximal end of the middle section;
a second bulbous end section at said distal end of the middle section;
a kibble storage cavity inside the elongated middle section, the kibble storage cavity extending at least between said proximal and distal ends; and
a rope wrapped around the elongated middle section and secured at the first and second bulbous end sections such that the rope passes over the kibble access window and the rope covers substantially all of a width and length of the kibble access window.

2. The kibble dispenser of claim 1, wherein:
the elongated middle section is substantially cylindrical in shape, 2-6 inches long, and 0.75-1.75 inches in diameter;
the kibble access window is substantially round and 0.25-0.75 inches in diameter; and
the first and second bulbous end sections are 1-3 inches wide.

3. The kibble dispenser of claim 1, wherein the first bulbous end section comprises a kibble insertion window for insertion of kibble into said kibble dispenser, wherein the kibble insertion window comprises a slide preventer in order to prevent kibble from sliding out of the kibble dispenser.

4. The kibble dispenser of claim 1, wherein the first and second bulbous end sections each comprise a rope window formed therein, and wherein the rope passes through the rope windows in order to secure the rope to the kibble dispenser.

5. The kibble dispenser of claim 4, wherein the rope windows are substantially cylindrical and 0.5-1 inch in diameter.

6. The kibble dispenser of claim 4, wherein central axes of the rope windows are perpendicular to a central axis of the elongated middle section.

7. The kibble dispenser of claim 4, wherein a central axis of a first rope window of the rope windows is offset to a first side of a central axis of the elongated middle section, and wherein a central axis of a second rope window of the rope windows is offset to a second side of the central axis of the elongated middle section, and wherein the first side is opposite the second side.

8. The kibble dispenser of claim 1, wherein the kibble dispenser comprises a plurality of surface texture elements thereon.

9. The kibble dispenser of claim 1, wherein the kibble dispenser comprises a chew resistant material.

10. The kibble dispenser of claim 1, wherein the kibble dispenser comprises a nylon, rubber, or plastic material.

11. The kibble dispenser of claim 1, wherein the kibble dispenser is substantially non-deformable.

12. The kibble dispenser of claim 1, wherein the first and second bulbous end sections comprise end section widths which are larger than a largest width of said elongated middle section.

13. The kibble dispenser of claim 1, wherein the first and second bulbous end sections each comprise a loop and a horn, wherein the loops comprise rope windows formed therein, and wherein a kibble insertion window is formed in the horn of the first bulbous end section.

14. The kibble dispenser of claim 1, wherein the elongated middle section comprises a reinforced section thereof.

15. The kibble dispenser of claim 1, wherein the kibble access window comprises a diameter larger than a kibble inserted into the kibble dispenser.

* * * * *